United States Patent
Bär et al.

(10) Patent No.: US 7,483,546 B2
(45) Date of Patent: Jan. 27, 2009

(54) DEVICE AND METHOD FOR HANDLING INSTALLATION AND TESTING INSTRUCTIONS

(75) Inventors: Harald Bär, Hemhofen (DE); Günther Domauer, Hetzles (DE); Wolfgang Esch, Diespeck (DE); Gabriele Franz, Erlangen (DE); Ardeshir Iranpour, Baiersdorf (DE); Jürgen Reinhardt, Aurachtal (DE)

(73) Assignee: Siemens Aktiengesellschaft, Munich (DE)

( * ) Notice: Subject to any disclaimer, the term of this patent is extended or adjusted under 35 U.S.C. 154(b) by 979 days.

(21) Appl. No.: 10/994,009

(22) Filed: Nov. 19, 2004

(65) Prior Publication Data
US 2005/0159834 A1 Jul. 21, 2005

(30) Foreign Application Priority Data
Nov. 21, 2003 (DE) ................. 103 54 810

(51) Int. Cl.
*G06K 9/00* (2006.01)
(52) U.S. Cl. ............ 382/100; 382/135; 382/137; 382/187
(58) Field of Classification Search ........... 382/112, 382/113, 137, 186, 187
See application file for complete search history.

(56) References Cited

U.S. PATENT DOCUMENTS

| | | | | |
|---|---|---|---|---|
| 4,998,753 A | * | 3/1991 | Wichael | 283/82 |
| 5,986,565 A | * | 11/1999 | Isaka | 340/5.42 |
| 6,609,659 B2 | * | 8/2003 | Sehr | 235/384 |
| 6,853,710 B2 | * | 2/2005 | Harris | 379/142.01 |
| 6,926,203 B1 | * | 8/2005 | Sehr | 235/492 |
| 2003/0065967 A1 | | 4/2003 | Garcia et al. | |

OTHER PUBLICATIONS

Hanno Wiechmann, Bernhard Zahlten and Falko Mayerl, "Dokumentenverwaltung & Wissensmanagement für Hochschulen", IBM Content Manager, Sep. 29, 2003, pp. 1-53.
Tridion, "Enterprise Content Management", 2002, pp. 1-20.

* cited by examiner

*Primary Examiner*—Yosef Kassa

(57) ABSTRACT

The invention relates to a device and method for creating, providing and documenting assembly and test instructions comprising the following components;
an acquisition device (1),
an interactive electronic documentation device (5) connected thereto for processing the captured assembly and test instructions, to which device
a telephone and address directory (6) and
a document management system (7) for exchanging status messages, order-specific assembly and test documents, text modules, control files and order data are connected,
a signature device (9) for verifying documents (8) created by the documentation device (5) and
an archive system (11) which is connected to the signature device (9) and the document management system (7).

19 Claims, 8 Drawing Sheets

FIG 3

| | | | |
|---|---|---|---|
| | Process control files: | /30705 FPA 01S | |
| 1. | Chapter A: Preparatory work | | |
| 1.1. | Basics 3D TOP | 30705 FPA 01K | (Released) |
| 1.2. | Reference list 3D TOP | 30705 FPA 02K | (Released) |
| 1.3. | Control panel 3D TOP | 30705 FPA 03K | (Released) |
| 1.4. | Indirect resources 3D TOP | 30705 FPA 25K | (Released) |
| 2. | Chapter 1: Preparatory work | | |
| 2.1. | Assembly inspection 3D TOP | 30705 FPA 04K | (Released) |
| 2.2. | Connections and enclosure manual 3D TOP | 30705 FPA 05K | (Transferred) |
| 3. | PE conductors and electrical connections | | |
| 3.1. | PE conductor resistance 3D TOP | 30705 FPA 07K | (Released) |
| 3.2. | Electrical connections 3D TOP | 30705 FPA 08K | (Released) |
| 3.3. | Carrier arm and spring reverse 3D TOP | 30705 FPA 10K | (Released) |
| 3.4. | Carrier arm + spring rev. w. telescop. ext. 3D TOP | 307005 FPA 26 | (Released) |
| 4. | Control unit | | |
| 4.1. | Mechanical elements, color coding 1 3D TOP | 30705 FPA 11K | (Released) |
| 4.2. | Key functions 3D TOP | 30705 FPA 13K | (Released) |
| 4.3. | Parking switch set 3D TOP | 30705 FPA 14K | (Released) |
| 4.4. | Control unit 3D TOP | 30705 FPA 15K | (Released) |
| 5. | Latches | | |
| 5.1. | Latches 3D TOP | 30705 FPA 16K | (Released) |
| 6. | Motion forces | | |
| 6.1. | Motion forces 3D TOP | 30705 FPA 17K | (Released) |
| 6.2. | Braking and patient recovery force 3D TOP | 30705 FPA 18K | (Released) |
| 6.3. | Beam geometry 3D TOP | 30705 FPA 19K | (Released) |
| 6.4. | Completion work ACSS 3D TOP | 30705 FPA 20K | (Released) |
| 7. | Chapter 2: Final inspection | | |
| 8. | Preparatory work | | |
| 8.1. | Device status 3D TOP | 30705 FPA 30K | (Released) |
| 8.2. | Connection of test tools manual 3D TOP | 30705 FPA 31K | (Released) |
| 9. | Layer functionality | | |
| 9.1. | Overvoltage and undervoltage 3D TOP | 30705 FPA 41K | (Released) |
| 10. | Completion work | | |
| 10.1. | Inspection completion manual 3D TOP | 30705 FPA 50K | (Released) |

FIG 4

| KAUF: 217954 | Serial no.: 285 | System type: | Multix Pro/Top |
| KAUF: 743241 | Mat.-Nr.: 370103 | Country: DE | Version: 1 |

| New | Returns | Open | Delete | Previous | Next | Files | Comments | Network | Accept | Process error | End |

| | | | | |
|---|---|---|---|---|
| 1. | Chapter A: Preparatory work | | M4 | to be entered. |
| 1.1. | Basics 3D TOP | | M5 | Note: If the stand is delivered without a depth diaphragm, a weight phantom is used for the test. |
| 1.2. | Reference list 3D TOP | | M6 | |
| 1.3. | Control panel 3D TOP | | M7 | |
| 1.4. | Indirect resources 3D TOP | | M8 | |
| 2. | Chapter 1: Preparatory work Assembly inspection 3D TOP | | M9 | • see test log 2 ("Production resources used") |
| 2.1. | Connections and enclosure manual 3D TOP | ☑ | M10 | • see DP routing plan of corresponding item code number |
| 2.2. | | ☑ | M11 | |
| 3. | PE conductors and electrical connections | | M12 | |
| 3.1. | PE conductor resistance 3D TOP | | M13 | |
| 3.2. | Electrical connections 3D TOP | ☑ | M14 | 25 |
| 3.3. | Carrier arm and spring reverse 3D TOP | | M15 | |
| | Carrier arm + spring rev. w. telescop. ext. 3D TOP | | M16 | |
| 4. | Control unit | | M17 | |
| 4.1. | Mechanical elements, color coding 1 3D TOP | ☑ | M18 | 26 |
| 4.2. | Key functions 3D TOP | ☑ | M19 | |
| 4.4. | Parking switch set 3D TOP | ☑ | M20 | |
| 5. | Control unit 3D TOP | | M21 | 27 |
| 5.1. | Latches | ☑ | M22 | |
| 6. | Latches 3D TOP | | M23 | |
| 6.1. | Motion forces | ☑ | M24 | |
| 6.2. | Motion forces 3D TOP | ☑ | | |
| 6.3. | Braking and patient recovery force 3D TOP Beam geometry 3D TOP | ☑ | | 24 |
| 6.4. | Completion work ACSS 3D TOP | | | *Torque wrench* |
| 7. | Chapter 2: Final inspection Preparatory work | | | Enter version or ID |

DEVICE AND METHOD FOR HANDLING INSTALLATION AND TESTING INSTRUCTIONS

CROSS REFERENCE TO RELATED APPLICATIONS this application claims priority to the German application No. 10354810.6, filed Nov. 21, 2003 which is incorporated by reference herein in its entirety.

FIELD OF INVENTION

The invention relates to a device and method for creating, providing and documenting order-specific assembly and test instructions.

BACKGROUND OF INVENTION

It is a known practice to create documents such as test instructions and log templates (DMR) using, for example, a word processing program such as WORD, FrameMaker or the like and to release and archive said documents by means of an electronic document management system. The test instructions and log templates are then made available in paper form to the reviewers for the respective customer order (DMR). In the subsequent system test only the relevant parts of the test instruction are performed and the results recorded in the log. After the conclusion of the review of the completed test log, said test log, supplemented by further paper documents, is scanned in and archived in the electronic document management system.

A general description of a document system based on an infrastructure for implementing integrated archive, document and content management services can be found in the article "Dokumentenverwaltung & Wissensmanagement für Hochschulen" (meaning: "*Document management & knowledge management for universities*") by Wiechmann, Zahlten and Mayerl, IBM Content Manager V8.2, published in September 2003.

SUMMARY OF INVENTION

An object of the invention is to embody a device of the type cited in the introduction such that creating assembly and test documentation, as well as using said documentation within the assembly and test process (eDeviceMasterRecord) and documenting the test results (eDeviceHistoryRecord), takes place without media discontinuities so that the workflow is mapped electronically without interfaces, whereby the requirements of CFR 21 Part 11 are to be taken into account.

The object is achieved by the claims.

Advantageously the device according to the invention can have a corporate directory which is connected to the signature device which carries out an authenticity check on the digital signature assigned to the document using data stored in the corporate directory.

It is beneficial if the individual components are connected via an intranet.

According to the invention the acquisition device can have a computer keyboard for manual testing, a scanning device for reading in documents and/or an interface or sensors of an automatic test unit.

A method for creating, providing and documenting assembly and test instructions by means of the following steps:

a) electronic generation of production and test specifications of all variants of a product, such as, for example, Q guidelines, process descriptions or drawings, b) electronic storage of production and test specifications of all variants of a product, c) electronic provision of the production and test specifications for a customer-specific product variant for the purpose of assembly and/or testing of the products, d) input and capture of the measurement results obtained during the assembly or testing phase by means of an acquisition device and e) electronic recordings relating to the creation and maintenance of each individual product specimen such as, for example, test results or serial numbers.

It has proven to be advantageous if step a) comprises the creation of complete assembly/test instructions using individual reusable text modules (multiple use), an electronic release of the instructions and/or text modules in an electronic document management system and/or archiving in the archive system.

Step c) can advantageously comprise an order-related compilation of the assembly/test instructions on the basis of SAP data.

According to the invention step e) can additionally comprise an electronic validity check of the test results (simplification of the DHR review), the use of formulae, documentation of deviations and test and measurement resources used, storage of test results in a SQL database for further analysis (trending), a digital signature for signing off the testing by means of Acrobat or M-Doc Signer and/or archiving as a "complete DHR" without an additional signature in the archive system.

BRIEF DESCRIPTION OF THE DRAWINGS

The invention will be explained in more detail below with reference to exemplary embodiments depicted in the drawings, in which:

FIG. 3 shows the user interface of a control file for explaining the process for the creation thereof, FIG. 4 shows the user interface for a test log for explaining the log generation process.

DETAILED DESCRIPTION OF INVENTION

Figure 1:
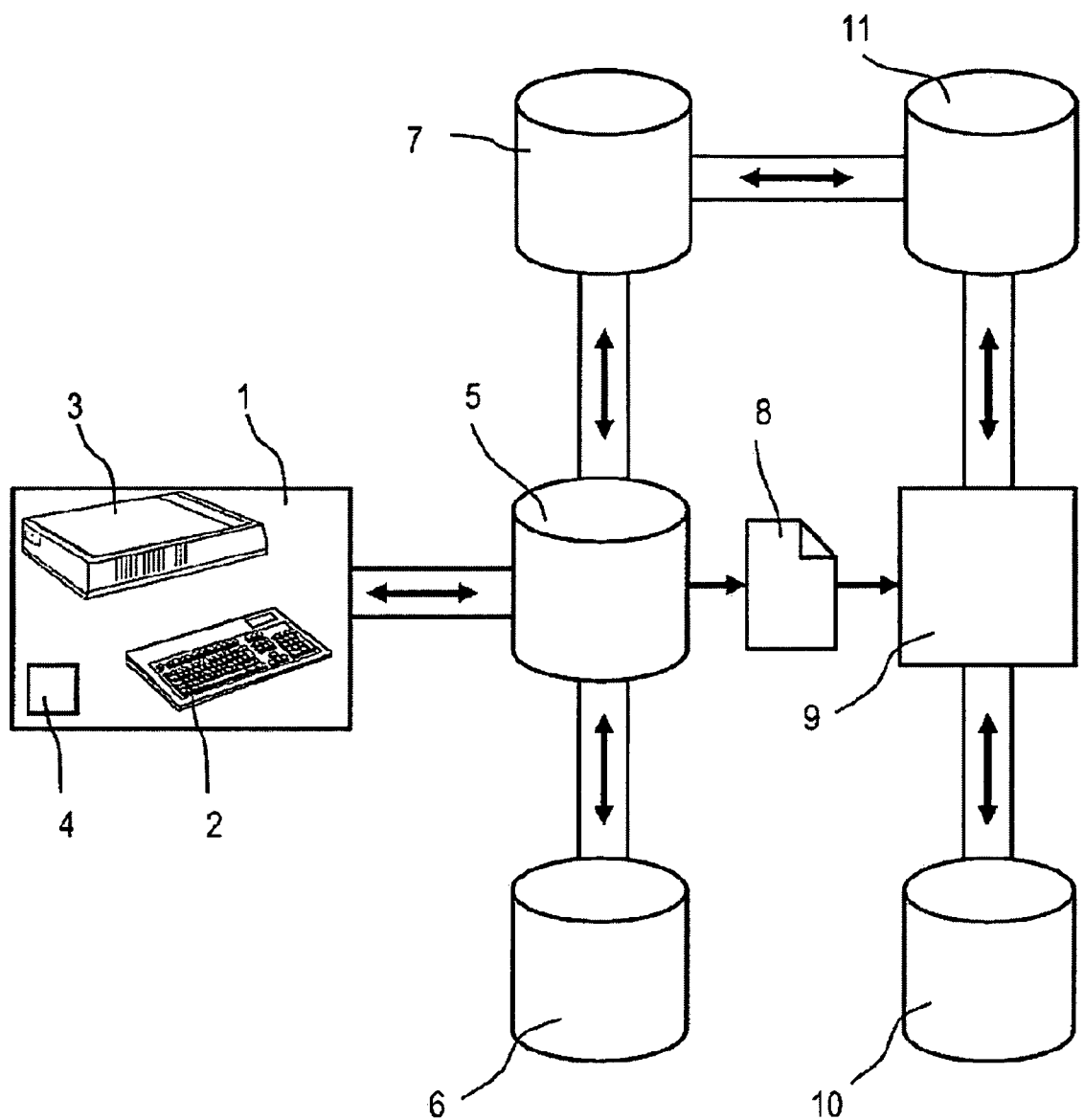
FIG. 1 shows a device for processing assembly and test instructions.

FIG. 1 shows a device provided for processing assembly and test instructions having an acquisition device 1 for assembly and test results which can comprise an input device such as a computer keyboard 2 for manual testing, a scan device 3 for reading in documents and/or an interface or sensors 4 of an automatic test unit.

The acquisition device 1 is connected to an interactive electronic documentation device 5 (IED). User data is supplied to the documentation device 5 via an intracompany telephone and address directory 6 (Meta Directory, MD). Also connected to the documentation device 5 is a document management system 7 (SAP EDM) which exchanges status messages, order-specific assembly and test documents, text modules, control files and order data with the documentation device 5. The documents 8 to be filed are supplied to a signature device 9 which is linked to a corporate directory 10 and carries out an authenticity check of the digital signature assigned to the document using the data stored in the corporate directory 10. After this, the documents and documentation are archived in an archive system 11. Successful archiving is reported directly to the document management system 7. All the components can be interconnected via an intranet.

Figure 2:
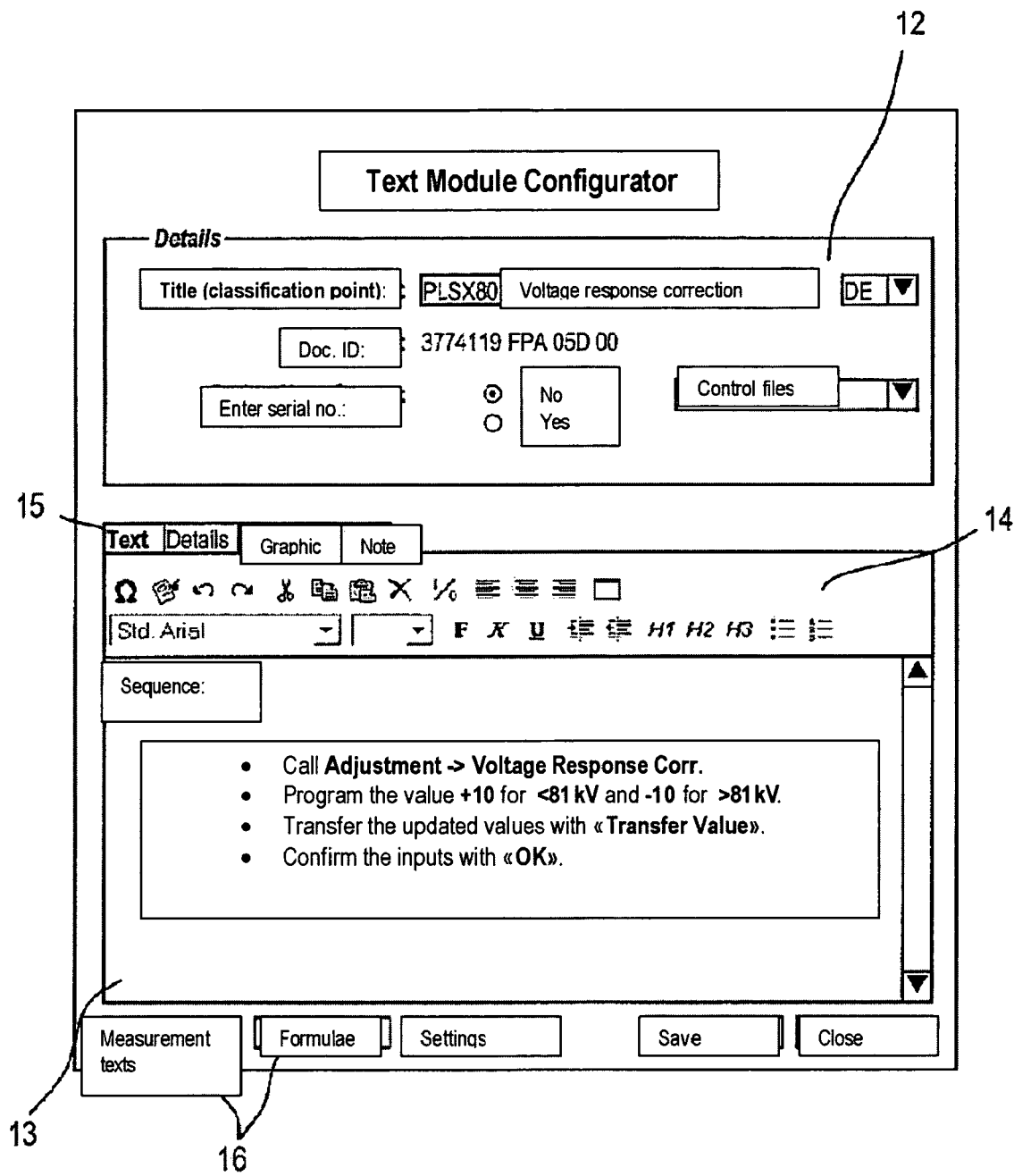
FIG. 2 shows the user interface of a text module editor for explaining the text module creation process.

FIG. 2 will now be used to explain a text module editor whose user interface is depicted. The text module editor is part of the IED 5 and effects the creation and processing of test and measurement instructions. Details such as the title or the classification point, country, the document identification number and further control options are provided in a higher-level area 12. The actual text part 13 has a control bar 14 comprising various generally known control functions. Tabs 15 can be used to switch between different views such as text, details, graphic and notes. A detailed verbal description of the execution sequence of a test step is provided in the main area of the text part 13 itself. In the example shown here a voltage response correction is performed. Measurement texts and formulae for calculating test results can be input and settings made by means of buttons 16 disposed under the text part. Furthermore the contents can be stored and the text module editor closed.

FIG. 3 shows a user interface for processing control files in which all the possible measurement steps are listed. A control file for a specific product is called via the IED 5, which product is specified in the control bar 17. The control file consists of a plurality of test chapters 18 and test and measurement steps 19. The individual test chapters 18 and test and measurement steps 19 are designated separately according to their function. Thus, the test chapters 18, for example, are marked by a folder. In the case of individual test and measurement steps 19 dependencies for the individual customer orders are stored with rules. This is designated by markers 20. Thus, a rule of this kind can indicate for example that only the country USA is affected, as illustrated by points 3.3. and 3.4.

However, this means that the test and measurement steps 19 marked in this way are not required for all of the tests, as will be explained in the following. After the test and measurement steps 19 have been designated the file is specified together with its status.

FIG. 4 depicts a user interface (UI) for a test log which can be accessed via the IED 5. The special customer order is specified together with its information in the upper part of a control bar 21. Only the test and measurement steps 19 required for this special customer order are listed in an overview folder. Thus, in this example the test steps 3.4. and 4.3. are not provided because they are not required for a product according to this special customer order.

The meaning and processing level of the test and measurement steps 19 are also marked. Thus, the spectacles 22 in front of the test and measurement steps 19 indicate that although the tester can read these this is not a mandatory field. The pens 23 mark mandatory fields in which inputs must be made. The checks 24 identify a test and measurement step 19 which has been performed and is in order. The test steps marked by a star 25 have been performed repeatedly and successfully completed. The test steps marked by a question mark 26 in a diamond have in fact been performed, but their measured values lie outside the tolerance range. This may be acceptable, but must be precisely recorded and documented. For this purpose special comments are then entered which can indicate why this overshooting of the tolerance range is acceptable.

To provide a better overview these markers can also be in color, whereby the checks 24 may be green, the stars 25 yellow and the question marks 26 blue.

The selected current test step is shown against a colored background in a known manner. The instructions serving for this are entered in the right-hand field.

The individual measurement steps 27 within a test step 19 can be called by means of the fields. An arbitrarily large number of said measurement steps can be configured for a test step 19 by the process planner. This provides the possibility of capturing test results including a possible target-versus-actual comparison, tolerance check etc. for a subsequent log.

The individual measurement steps 27 are described in detail in a text field 28.

The test log is accessed via the IED 5 by a test person and processed sequentially step by step. At the same time the measured values obtained in the test steps 19 marked by the pen 23 are entered via the acquisition device 1 and for logging are first buffered in the documentation device 5 and on completion of the test are stored in the archive system 11, the results being provided with a verified signature of the tester by means of the signature device 9.

By means of the device according to the invention the handling of assembly and test instructions can be described by the following steps:

a) Production and test specifications for all variants of a product such as, for example, Q guidelines, process descriptions or drawings are generated electronically by means of the acquisition device 1 and the IED 5.

b) Next, the production and test specifications for all variants of a product are stored in electronic form in the document management system 7 (SAP EDM).

c) For assembly and/or testing of the products the production and test specifications for a customer-specific product variant are provided in electronic form by the IED 5.

d) Measured results obtained during the assembly or testing are entered by means of the acquisition device (1).

e) The creation and maintenance of each individual product specimen such as, for example, test results or serial numbers are logged in detail and stored in electronic form in the archive system 11.

In step a), in addition, complete assembly/test instructions can be produced by means of individual text modules for reuse and multiple use. Instructions and/or text modules contained in an electronic document management system (7) can be released electronically and stored in the archive system (11).

In step c), in addition, the assembly/test instruction can be compiled for a specific order on the basis of SAP data.

Furthermore, in step e) an electronic validity check of the test results (simplification of the DHR review) can be performed. Formulae can also be used. Deviations and test and measurement resources used can be documented in addition. Test results can be stored in a SQL database for further analysis (trending). For signing off of the test the documents and documentation can be digitally signed by means of Acrobat or M-Doc Signer. Finally a "complete DHR" without additional signature can be archived in the archive system 11.

The execution sequence without interfaces is mapped electronically by means of the interactive electronic documentation device 5 according to the invention and the introduction of a tool for example on a software basis for creating and using assembly and/or test documentation. The requirements of the Code of Federal Regulations (CFR) 21 Part 11 must be taken into account in this case. CFR 21 Part 11 forms part of the statutory regulations issued on the part of the Food and Drug Administration (FDA). The following details can be represented here:

- modular structure of the production documentation,
- automatic compilation of the production documents on the basis of SAP order data,
- electronic validity check of the test results,
- electronic acquisition of test data,
- electronic release including digital signature of DHRs as well as archiving via SAP EDM (archive system 11),
- use of the DP tool by means of LAN and WLAN, and
- Web-based presentation (access by means of intranet).

On account of the inventive embodiment of the device for handling assembly and test instructions, assembly and test documents can be easily created and used without media discontinuities within the assembly and test process (eDeviceMasterRecord) and the documentation of the test results (eDeviceHistoryRecord).

eDMR—creation (planning)
Production of complete assembly/test instructions by means of individual text modules for reuse (multiple use),
Electronic release of the instructions/text modules in the document management system 7 (EDM), archiving in the archive system 11,
eDMR—provision (assembly/testing)
Order-related compilation of assembly/test instructions on the basis of SAP data
eDHR
Electronic validity check of the test results (simplification of the DHR review),
Use of formulae,
Documentation of deviations and test and measurement resources used,
Test results in SQL DB for further analysis (trending),
Digital signature to sign off the test by means of standard software packages such as Acrobat, Mentana and/or M-Doc Signer, and
Archiving as "complete DHR" without additional signature in the archive system.

As a result of the modular structure of the test instruction individual test steps 19 can be reused repeatedly without having to be created anew. This also reduces the maintenance and updating of individual test steps 19. This is also achieved by the harmonization of the editor.

The test instruction including associated test log generated on the basis of SAP customer order data (FIG. 4) now only includes the necessary test steps 19.

As a result of the integrated checking of the entered test results including the calculation using formulae, quality is considerably increased and checking during the review considerably facilitated.

Test logs can be electronically released and digitally signed by means of the signature device 9 using Acrobat and M-Doc Signer from Mentana.

As a further advantage of the device according to the invention or, as the case may be, the method according to the invention there is a resulting flexibilization of production through the use of a wireless LAN in connection with the use of the IED 5.

The end-to-end electronic process from the generation of assembly and test documents through to the archiving of the individual system DHRs in an electronic archive system 11 reduces possible process errors.

Figure 5:
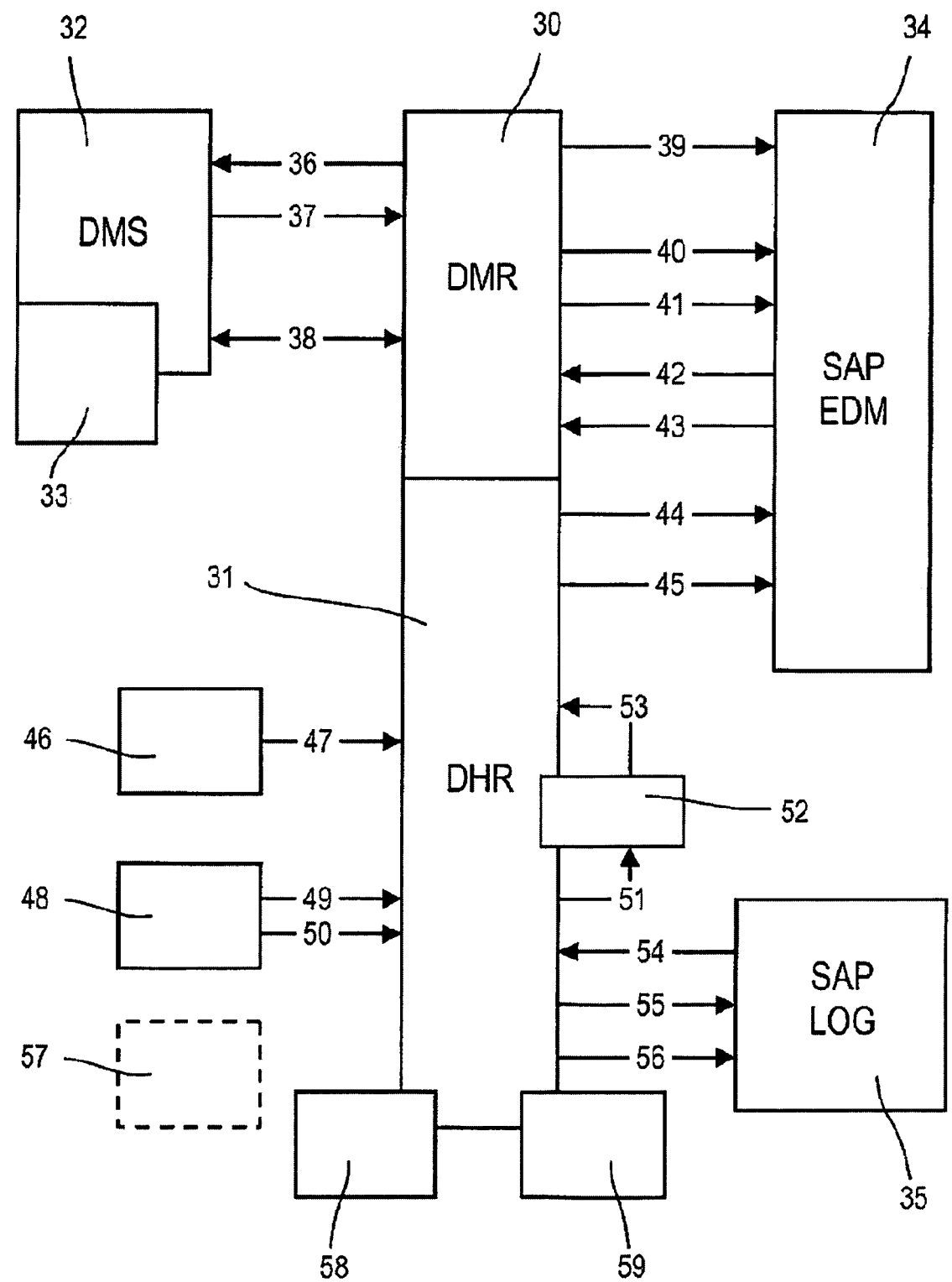
FIG. 5 shows the object flow within the electronic documentation device IED.

FIG. 5 shows the object flow within the electronic documentation device IED in overview. At the center are the Device Master Record 30 (DMR) and the Device History Record 31 (DHR). Also required in addition are a document management system 32 (DMS) with a translation tool 33 and a SAP document management module 34 (SAP EDM) and a SAP logistics module 35 (SAP LOG). The Device Master Record 30 supplies monolingual process documents 36 to the document management system 32 which delivers multilingual process documents 37 by means of the translation tool 33. Existing documents 38 can be used here on both sides.

The DMR 30 initiates a test, assembly, generation of packing lists, installation and startup. First it passes production-relevant assembly and test instructions 39 to the SAP document management module 34. After the generation of multilingual process documents 37 assembly and startup instructions (POD) 40 are transferred to the SAP document management module 34. Packing lists 41 are then transferred. Existing DMR documents 42 can be used by the SAP document management module 34 thanks to the DMR 30. A feedback message 43 concerning the SAP status is also issued. Signed documents 44 are supplied to the SAP document management module 34 by the DHR 31. Furthermore the release of the document information record (DIS) and the status update 45 are also transferred to the SAP document management module 34.

Documents are added to the DHR 31 by means of a scan component 46 via a DHR scan 47. Manual test data 49 and test data can be input into the DHR 31 by means of a test data acquisition 48 and a tester 50 respectively. By means of a PDF transfer 51 the PDF documents are signed in an external component 52 for the verification of a digital signature and returned to the DHR 31 as a signed PDF document 53.

Customer order and production order data 54 (KAUF/FAUF) are extracted from the SAP logistics module 35. Feedback messages from the DHR 31 to the SAP logistics module 35 are passed via feedback points 55 and service messages 56. The DHR 31 also has access to production machines 57, process traceability 58 and material traceability 59.

Figure 6:
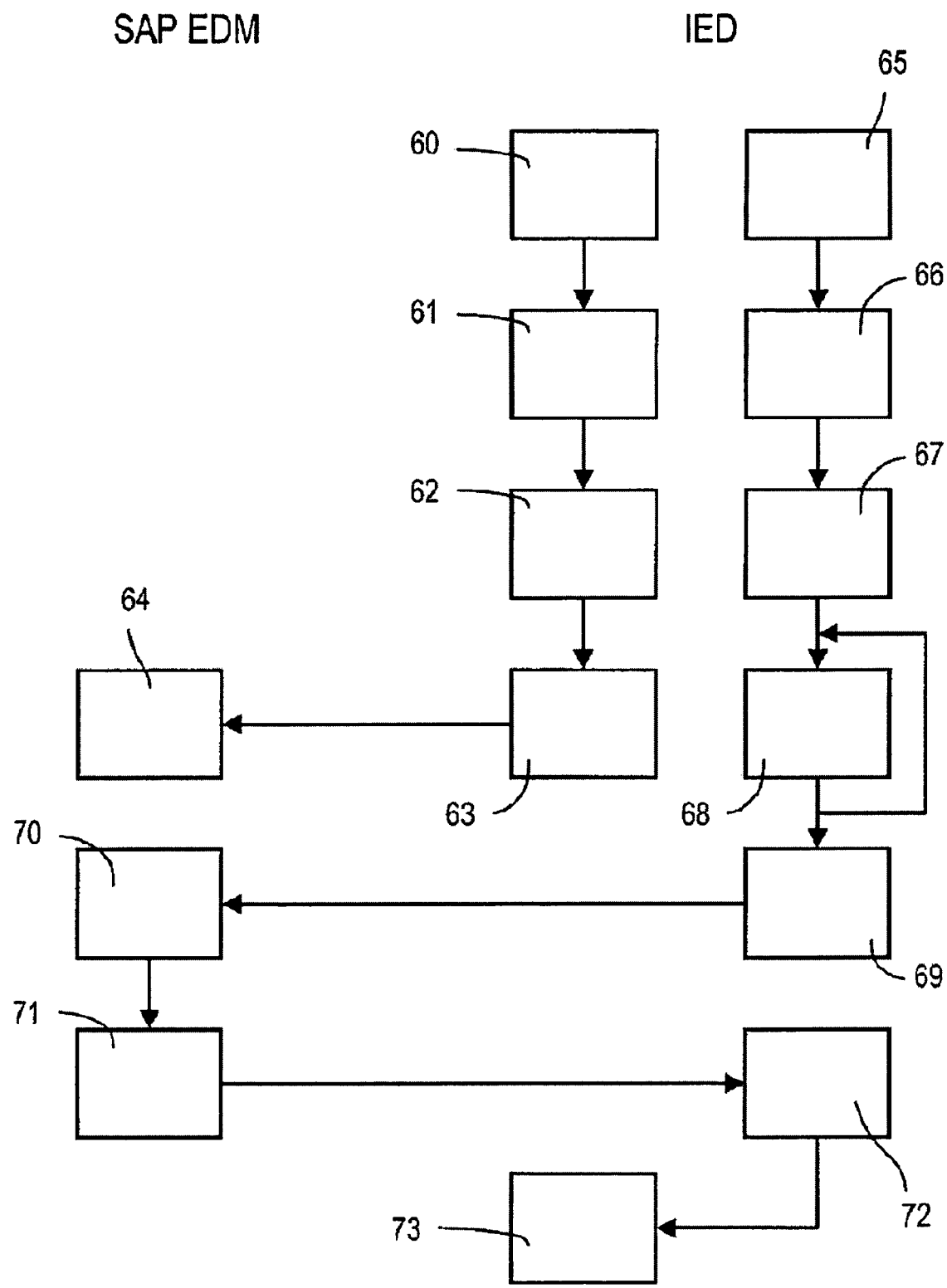
FIG. 6 shows the DMR part of the object flow of the application IED.

The DMR part of the object flow of the application IED is explained in greater detail in FIG. 6. The process steps performed by SAP EDM are arranged and represented on the left-hand side and those performed by IED are arranged and represented on the right-hand side. The generation 60 of text modules (TB) takes place in a first process. The configuration 61 of said text modules takes place in a further process step. Following a review 62 of the text modules there is a release 63 associated with the review. Next, PDF documents are transferred by SAP EDM 64.

The creation 65 of control files into which text modules can be integrated in a step 66 takes place in a further process. A system assignment 67 is then performed. Simulations and tests 68 are performed in a recurring loop. If the simulation and the tests 68 are successful, a PDF conversion 69 is performed and in step 70 the control files are transferred to SAP EDM as PDF files. The release 71 of the control files then takes place and a status feedback message 72 is sent to the IED. As a final step the text modules are subjected to a workflow release 73 (WF).

Figure 7:
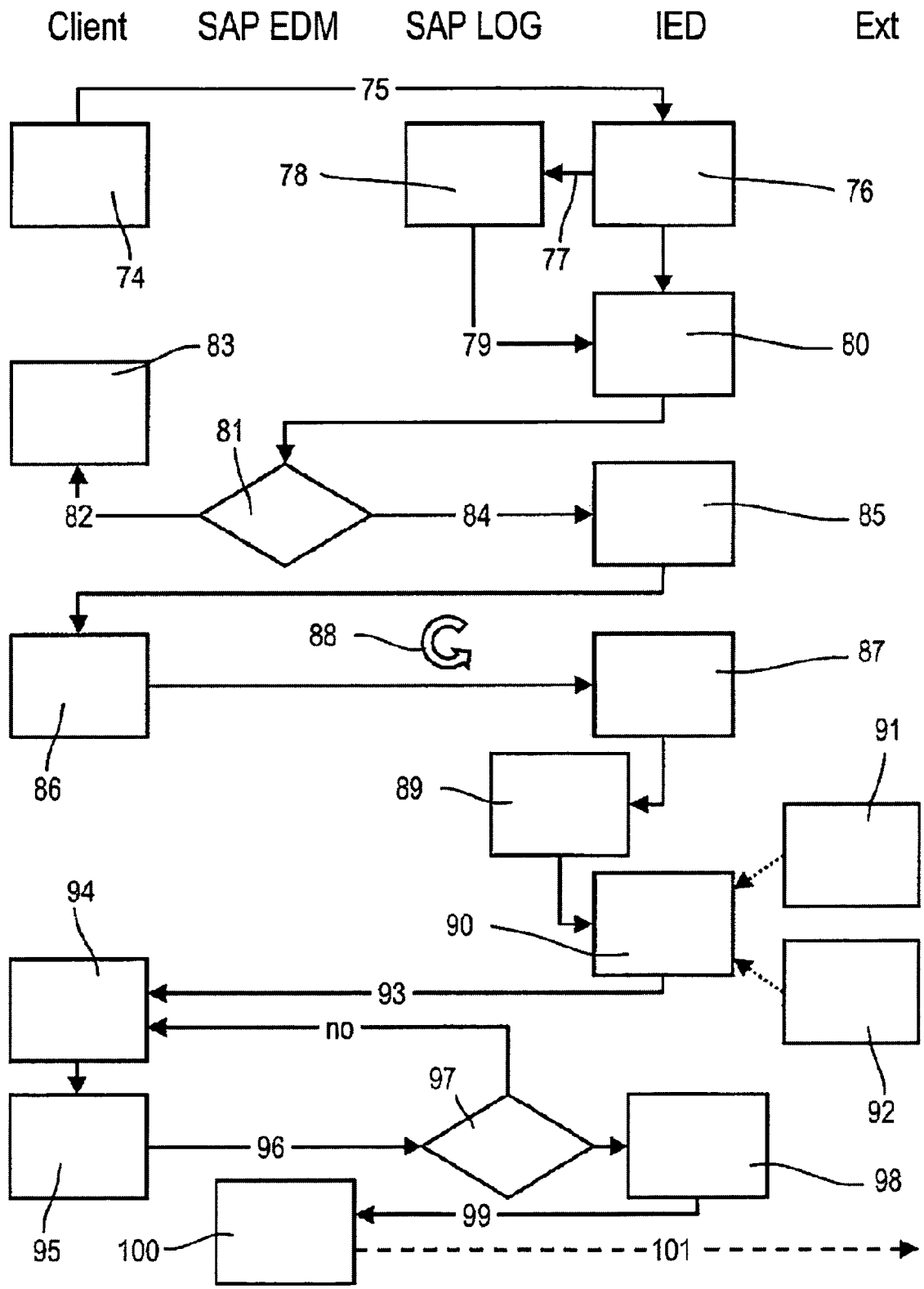
FIG. 7 shows the process flow of the testing and FIG. 8 shows the process flow of the DHR scan.
Figure 8:
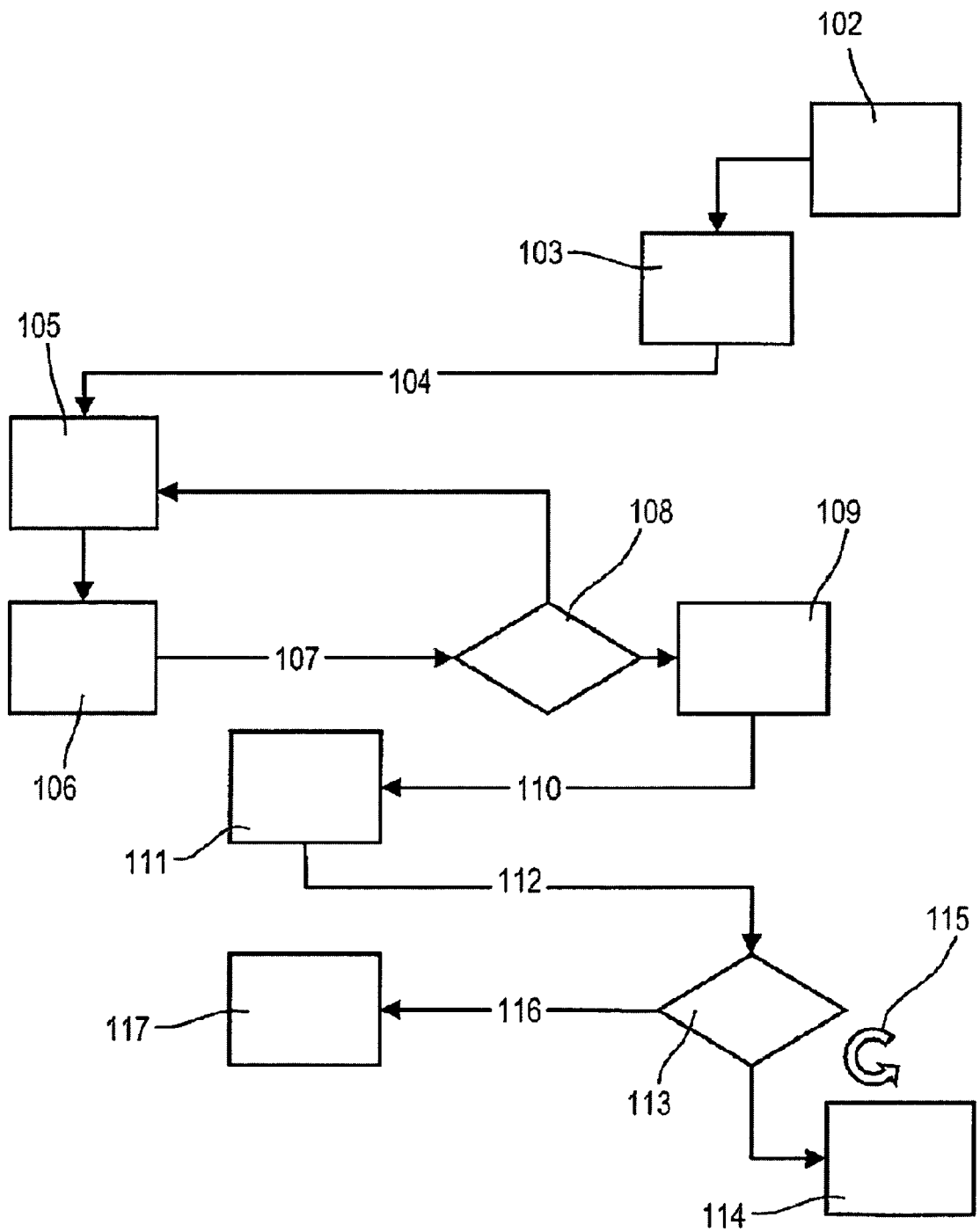

The test shown in FIG. 7 is performed by the following systems:

External systems EXT, IED, SAP logistics module (SAP LOG), SAP EDM and the customer (client). First to happen is an acquisition 74 of the production order FAUF and the serial number which is passed, in step 75, to a module 76 which queries whether a production order FAUF is present in the system. If this is not the case, there is a request for the FAUF 77 and a feedback point for progress of the work (RMP) 78 is set. Next, an extraction 79 of the FAUF is performed which leads to an internal determination of the test instruction 80. In the case of a production order being present there is an immediate transition from step 76 to the internal determination 80. A query 81 is then made to determine whether the control file (CF) has been released by the SAP EDM. In the case of a NO 82 an abort message 83 is issued. In the affirmative case 84, special test instructions 85 are generated next. Upon completion of the logging 86 of the test results a validity check 87 is performed. These steps 85 to 87 can be passed through repeatedly, as indicated by the arrow 88. After an acceptance check by means of an electronic signature 89 the conversion 90 into PDF documents takes place. At the same time scan files 91 and attachments 92 can be attached. The transfer 93 of the PDF and document parameters is followed by a digital signature 94 on the basis of the PKI by the client. For security purposes a verification 95 is performed against the SCD. Following a transfer 96 of the signature parameters the verification of the digital signature is performed by an external component 97. If the verification cannot be performed, the digital signature 94 is initiated repeatedly. If, on the other hand, it was successful, it is forwarded to an internal document management system (DMS) 98. From this system there takes place a transfer 99 of the document information record and the PDF files for archiving 100 in the SAP EDM. A status feedback message 101 is then issued.

shows the process flow of the DHR scan. The scan files 102 are added to a PDF converter 103 which performs a transfer 104 of the PDF and document parameters. On completion of the digital signature 105, for example on the basis of the PKI, a verification 106 against the SCD is performed. The digital signature parameters are checked after a transfer 107 and a query 108 which checks the verification. If the signature was not successful the step 105 must be repeated. Otherwise the parameters can be stored in the internal document management system 109. The transfer 110 of the PDF files to the SAP EDM is followed by an archiving step 111. The status feedback message 112 is supplied to a query 113 to determine whether the scan and the log are satisfactory. If this should not be the case, corrections 114 can be carried out. This operation can be executed multiple times, as indicated by the arrow 115. If the result of the query 113 is that both the scan and the log are in order, a release 116 of the document identification (DIS) and the release 117 is stored in the EDM.

By means of the system according to the invention and the process flows according to the invention the full production workflow can be recorded, checked and documented on an order-specific basis. For each customer order a documentation of all test results together with validity check can be performed online by the logistics module. At the same time test dependencies can be entered on the basis of a dynamic operator prompting system by means of which it is achieved, for example, that a step cannot be executed until conditions have been met, for example three preceding steps have been completed. The dynamic operator prompting system can be modified during the test for example by means of an update of the instructions.

ANNEX

Abbreviations Used in the Description:

| | |
|---|---|
| CF | Control File |
| CFR | Code of Federal Regulations |
| DHR | Device History Record |
| | Recordings relating to creation and maintenance of every individual product specimen, e.g. test results, serial numbers |
| DIS | Document information record |
| DMR | Device Master Record |
| | Production specifications, e.g. Q guidelines, process descriptions, drawings |
| DMS | Document Management System |
| eDHR | eDeviceHistoryRecord |
| EDM | Electronic Document Management |
| eDMR | eDeviceMasterRecord |
| EHR | Development drawings, e.g. specifications, test results |
| FAUF | Production order (SAP) |
| FDA | Food and Drug Administration |
| IED | Interactive Electronic Documentation device |
| KAUF | Customer order (SAP) |
| MD | Meta Directory |
| Pdfy | External component for verifying the digital signature |
| PKI | Public Key Infrastructure |
| POD | Printing on Demand |
| RMP | Feedback point for progress of work (SAP) |
| SAP EDM | SAP document management system |
| SCD | Siemens Corporate Directory |
| SQL DB | Structured Query Language Data Base |
| TB | Text module |
| WF | WorkFlow |

The invention claimed is:

1. A device for creating, providing and documenting order-specific assembly and test instructions, comprising:
an acquisition device for inputting assembly and test instructions;
an interactive electronic documentation device connected to the acquisition device for processing the inputted assembly and test instructions and for generating order-specific assembly and test documents based on the assembly and test instructions;
a telephone and address directory operatively connected to the interactive electronic documentation device;
a document management system connected to the interactive electronic documentation device for exchanging status messages, the order-specific assembly and test documents, text modules, control files and order data;
a signature device for validating the order-specific assembly and test documents generated by the interactive electronic documentation device; and
an archive system connected to the signature device and the document management system.

2. The device according to claim 1, further comprising a corporate directory connected to the signature device for executing an authenticity check of a digital signature assigned to order-specific assembly and test documents by the signature device based on data stored in the corporate directory.

3. The device according to claim 1, wherein the acquisition device, the interactive electronic documentation device, the telephone and address directory, the document management system, the signature device and the archive system are connected to each other using an Intranet.

4. The device according to claim 1, wherein the acquisition device includes a computer keyboard for performing a manual testing procedure.

5. The device according to claim 1, wherein the acquisition device includes a scanning device for electronically reading in documents.

6. The device according to claim 1, wherein the acquisition device includes an interface or sensors of an automatic test unit.

7. A method of creating, providing and documenting order-specific assembly and test specifications, comprising:
   electronically generating assembly and test specifications of all variants of a product;
   electronically storing the assembly and test specifications of all variants of the product;
   electronically providing assembly and test specifications of a customer-specific product variant of the product for assembling and/or testing the product;
   acquiring measuring results obtained during assembly or testing of the customer-specific product variant by an acquisition device; and
   electronically recording information related to assembling and maintaining each copy of the customer-specific product variant.

8. The method according to claim 7, wherein the electronic generating of the assembly and test specifications of all variants of the product includes generating a complete set of assembly and test instructions using a plurality of text modules.

9. The method according to claim 7, wherein the electronic generating of the assembly and test specifications of all variants of the product includes an electronic release of the assembly and test specifications and/or text modules in an electronic document management system.

10. The method according to claim 8, wherein the electronic generating of the assembly and test specifications of all variants of the product includes an electronic release of the text modules in an electronic document management system.

11. The method according to claim 7, wherein the assembly and test specifications of all variants of the product are stored in an archive system.

12. The method according to claim 7, wherein the electronic providing of the assembly and test specifications of a customer-specific product variant of the product includes an order-related compilation of the assembly and test specifications on the basis of SAP data.

13. The method according to claim 7, wherein the acquiring of the measuring results includes an electronic validity check of the measuring results.

14. The method according to claim 7, wherein the acquiring of the measuring results includes using a formula for calculating at least one of the measuring results.

15. The method according to claim 7, wherein the electronic recording of the information related to assembling and maintaining each copy of the customer-specific product variant includes documenting measuring deviations related to the measuring results.

16. The method according to claim 7, wherein the electronic recording of the information related to assembling and maintaining each copy of the customer-specific product variant includes documenting test and measurement resources used for acquiring the measuring results.

17. The method according to claim 7, wherein the measuring results are stored in an SQL database for further analysis.

18. The method according to claim 7, wherein a digital signature is used for signing off the measuring results using Acrobat or M-Doc Signer.

19. The method according to claim 7, wherein the electronic recording of the information related to assembling and maintaining each copy of the customer-specific product variant includes storing the information related to assembling and maintaining each copy of the customer-specific product variant as a "complete DHR" without additional signature in an archive system.

* * * * *